United States Patent [19]
Alferness et al.

[11] 4,400,052
[45] Aug. 23, 1983

[54] METHOD FOR MANUFACTURING BIREFRINGENT INTEGRATED OPTICS DEVICES

[75] Inventors: Rodney C. Alferness; Janet L. Jackel, both of Holmdel, N.J.

[73] Assignee: Bell Telephone Laboratories, Incorporated, Murray Hill, N.J.

[21] Appl. No.: 245,628

[22] Filed: Mar. 19, 1981

[51] Int. Cl.³ .............................................. G02B 5/174
[52] U.S. Cl. ............................. 350/96.12; 65/30.13; 350/96.11
[58] Field of Search ............... 350/96.11, 96.12, 96.13, 350/96.14; 264/1.1, 1.5; 252/584; 65/30.13; 148/1.5, 186, 188, 191

[56] References Cited

U.S. PATENT DOCUMENTS

| | | | |
|---|---|---|---|
| 4,196,963 | 4/1980 | Chen et al. | 350/96.12 |
| 4,329,016 | 5/1982 | Chen | 350/96.12 |
| 4,348,074 | 9/1982 | Burns et al. | 350/96.11 |

OTHER PUBLICATIONS

Heibei et al, "Fabrication of Strip Waveguides in LiNbO₃ by Combined Metal Diffusion and Ion Implantation", *Conf. on Int. and Guided-Wave Optics: Tech. Digest*, Incline Village, Nev., (U.S.A.), Jan. 1980, pp. TuD3-1 to 4.
IEEE Transactions on Microwave Theory and Techniques, vol. MTT-23(1), H. Kogelnik, pp. 2-16, (1975).
Internat'l Conf. on Integrated Optics & Optical Fiber Communications, J. Noda & M. Fukuma, Tokyo, 1977, pp. 575-578.
Applied Optics, vol. 13(10), J. R. Carruthers et al., pp. 2333-2342, (1974).
Applied Physics Letters, vol. 25(8), R. V. Schmidt and I. P. Kaminow, pp. 458-460, (1974).
American Ceramic Society Bulletin, vol. 49, W. G. French & A. D. Pearson, pp. 974-977, (1970).
Applied Physics Letters, vol. 26(11), pp. 652-653, (1975), M. L. Shah.
Applied Optics, vol. 19(12), pp. 1996-1999, (1980), J. L. Jackel.
Applied Physics Letters, vol. 36(7), pp. 513-515, (1980), R. C. Alferness.
U.S. patent application S.N. 228,465, filed Jan. 26, 1981, (J. Jackel Case 2) entitled "Method for Producing Devices Comprising Optical Waveguiding Structures".
U.S. patent application, R. C. Alferness Case 7, entitled "Tunable Polarization Independent Wavelength Filter", filed concurrently with the instant application.

*Primary Examiner*—John D. Lee
*Attorney, Agent, or Firm*—Peter V. D. Wilde; Eugen E. Pacher

[57] ABSTRACT

Method for adjusting the value of birefringence in predetermined sections of waveguides in integrated optics devices fabricated in optically anisotropic substrates such as monocrystalline $LiNbO_3$ or $LiTaO_3$. The inventive method comprises in combination methods for changing both refractive indices in a first volume of the substrate, such as, for instance, ion implantation or metal in-diffusion, thereby creating an optical waveguide for both TE and TM modes of radiation, and methods for further changing one of the indices in a second volume of the substrate, without proportionally changing the other index in the second volume, such as, for instance, Li out-diffusion or ion exchange. In a typical application, the first volume comprises waveguiding regions, including the section in which the birefringence is to be adjusted, and the second volume also includes that waveguide section. The inventive methods are advantageously employed in the manufacture of integrated optics devices whose operating characteristics depend on the value of birefringence of a section of waveguide, for instance, a mode converter/wavelength filter, or a polarization separator.

18 Claims, 5 Drawing Figures

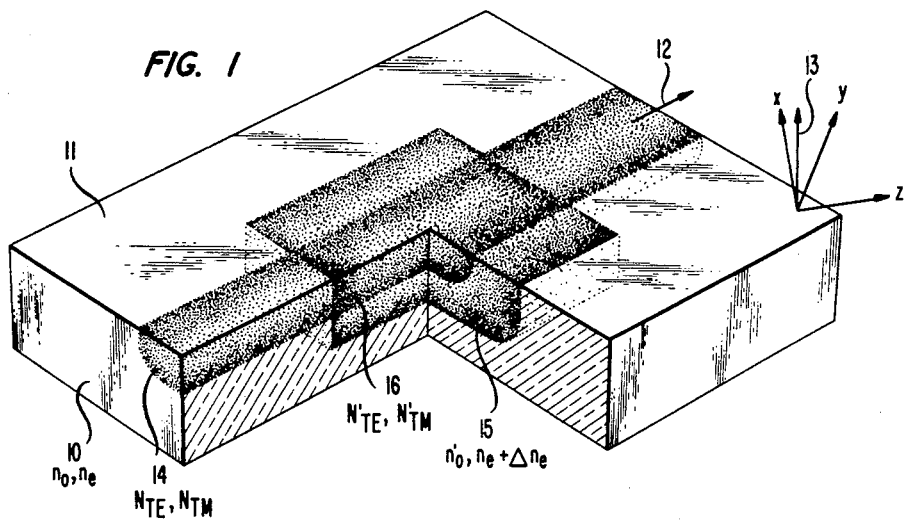
FIG. 1
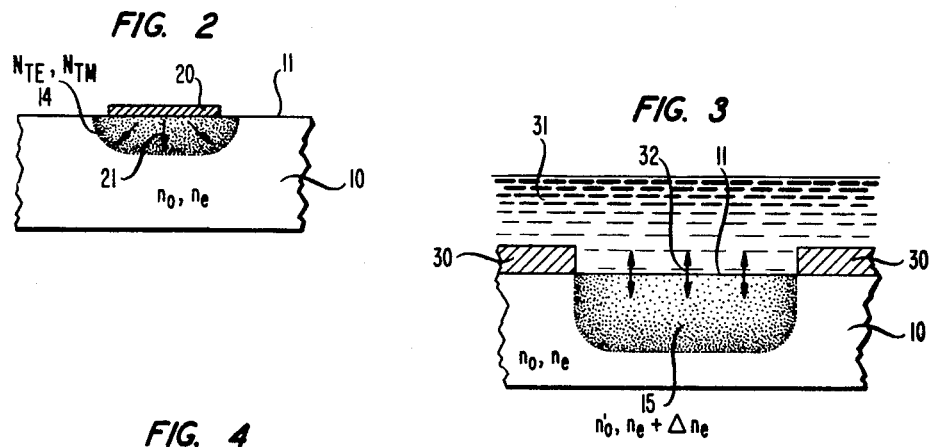
FIG. 2
FIG. 3
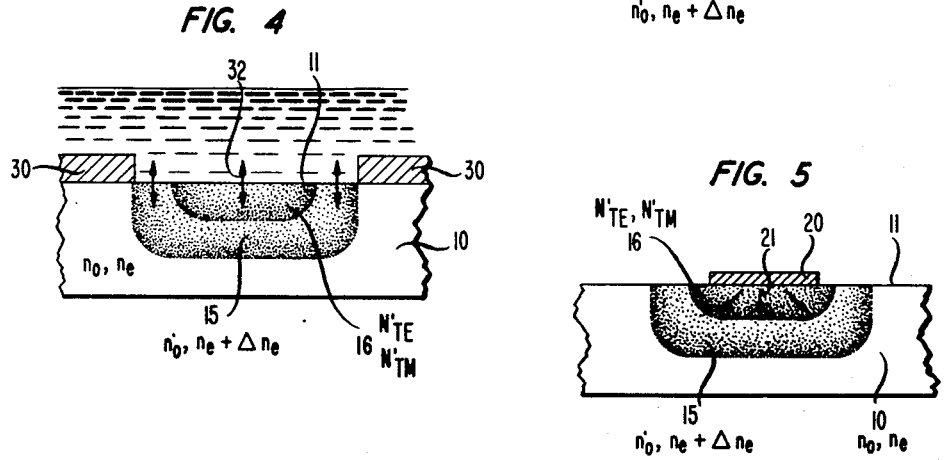
FIG. 4
FIG. 5

METHOD FOR MANUFACTURING BIREFRINGENT INTEGRATED OPTICS DEVICES

FIELD OF THE INVENTION

This application pertains to methods for manufacturing integrated optics devices incorporating thin optical waveguiding layers or films. In particular, it pertains to a method for adjusting the value of birefringence in such devices.

BACKGROUND OF THE INVENTION

An integrated optics device is typically manufactured on a substrate, and comprises a region or regions in which the optical properties of the substrate material have been altered by some means. In particular, very commonly the refractive index of such regions is increased over that of the substrate material, thereby imparting to a properly shaped region the ability to guide electromagnetic radiation of the appropriate wavelength, typically in the visible or near infrared, by means of total internal reflection.

Although some passive devices, e.g., waveguides, directional couplers, and filters, can be manufactured on amorphous substrate materials such as glass, many devices have to be fabricated on monocrystalline substrates, and it is with a subgroup of the latter that this application is concerned.

Materials that have been found to form useful monocrystalline substrates are, inter alia, the ferroelectrics $LiNbO_3$ and $LiTaO_3$, which belong to the trigonal crystal class. Trigonal crystals are optically uniaxial, with the crystalline Z-direction conventionally oriented parallel to the optical axis, which is normal to the plane containing the, at least for some purposes nonequivalent, mutually perpendicular X- and Y-directions.

The optical behavior of optically anisotropic crystals such as $LiNbO_3$ or $LiTaO_3$ can be described by means of two refractive indices, usually termed the ordinary refractive index $n_o$ and the extraordinary index $n_e$. Whereas both indices typically are frequency dependent, only $n_e$ depends also on the direction of propagation of the electromagnetic radiation. In the general case, light propagating through an optically anisotropic medium such as an uniaxial crystal is resolved into two nondegenerate modes of well-defined polarization, the isotropic mode, described by the ordinary index of refraction, and the anisotropic mode, whose phase velocity and propagation direction in the general case depend on both $n_o$ and $n_e$. In integrated optics devices the geometrics typically are arranged such that the guided radiation propagates parallel or nearly parallel to one of the crystal axes. In such a case, both modes always propagate in the same direction, albeit generally at different phase velocities, except when propagating parallel to the Z-direction.

Various methods exist for increasing one or both of the refractive indices of $LiNbO_3$ or $LiTaO_3$ which can be used to manufacture waveguiding structures in these materials. Among these are ion implantation, Li out-diffusion, metal in-diffusion, and ion exchange. In particular, in-diffusion of a transition metal, for instance Ti, is currently frequently used for this purpose.

Several of the common methods for raising the refractive index of $LiNbO_3$ or $LiTaO_3$, including ion implantation and Ti in-diffusion, affect both $n_o$ and $n_e$, typically in proportional amounts. Although this is usually a desirable characteristics of these methods, since it, for instance, permits the formation of waveguides capable of guiding modes of either the TE or TM type, the fact that the amount of birefringence of the guiding region is not independently adjustable is a disadvantage for that class of integrated optics devices whose operational characteristics depend on the amount of birefringence of some region of the device. By "amount of birefringence" we mean the difference between the effective indices of a waveguide $N_{TE}$ and $N_{TM}$, if the term refers to a waveguiding region, or to the quantity $n_o - n_e$, if it does not refer to such a region.

On the other hand, it is known that, for instance, Li out-diffusion as well as Ag/Li ion exchange substantially increase only $n_e$ in $LiNbO_3$ or $LiTaO_3$. This property of Li out-diffusion has been used to manufacture waveguides for anisotropic modes in these materials. See for instance J. R. Carruthers et al, *Applied Optics*, Vol. 13(10) pp. 2333–2342 (1974). Ion exchange has been used previously to manufacture optical waveguides in glass. W. G. French and A. D. Pearson, *American Ceramic Society Bulletin*, Vol. 49, pp. 974–977, (1970). The technique was later also applied to the manufacture of waveguides in $LiNbO_3$. N. L. Shah, *Applied Physics Letters*, Vol. 26(11), pp. 652–653, (1975) immersed polished X-cut samples of $LiNbO_3$ in a $AgNO_3$ melt at approximately 260° C., for periods of several hours. It was found that this procedure resulted in the formation of waveguides for the anisotropic (i.e., TE) mode propagating in the Y-direction. Ag/Li exchange thus also substantially increases only $n_e$ in X-cut $LiNbO_3$. It was also found that this exchange is strongly orientation dependent, proceeding at a substantial rate in X-cut, but not in Y- or Z-cut, crystals.

SUMMARY OF THE INVENTION

Disclosed is a method for adjusting the value of birefringence in predetermined sections of waveguides in integrated optics devices fabricated in optically anisotropic substrates such as monocrystalline $LiNbO_3$ or $LiTaO_3$. The inventive method comprises in combination methods for changing both refractive indices in a first volume of the substrate, thereby creating a waveguide capable of guiding both TE and TM modes of electromagnetic radiation, and methods for further changing one of the indices in a second volume of the substrate, without proportionately changing the other index in the second volume. In a typical application the first volume as well as the second volume comprise the section of the waveguide in which the birefringence is to be adjusted. Exemplary techniques for a particular variant of the invention, namely raising both $n_o$ and $n_e$ in the first volume, are, for instance, metal in-diffusion such as Ti in-diffusion, and ion implantation. And exemplary techniques for another variant, namely raising $n_e$ in the second volume without substantially increasing $n_o$ therein, are, for instance, ion exchange such as Li/Ag exchange or Li/Tl exchange, and Li out-diffusion.

The ability to make such independent adjustment of the birefringence in predetermined sections of waveguides in $LiNbO_3$ and $LiTaO_3$, including, as a special case, to achieve zero birefringence, makes possible, inter alia, the manufacture of devices having improved operating characteristics. For example, the inventive procedure is advantageously employed in the manufacture of devices whose operating characteristics depend on the value of the birefringence of a section of waveguide, such as, for instance, the mode converter/- wavelength filter described by R. C. Alferness in *Applied Physics Letters*, Vol. 36(7), pp. 513–515 (1980), or the polarization separator (or mode splitter) disclosed in the copending application, R. C. Alferness Case 7, "Tunable Polarization Independent Wavelength Filter," Ser. No. 245,626. For instance, in the former the ability to decrease the value of the birefringence allows production of devices having a broader passband for a given device length, and increased electrode period. And in the latter, the mode splitter, the ability to change one index without substantially affecting the other allows tailoring of the propagation constants of the interacting waveguide sections, resulting in improved efficiency of separation of TE and TM modes.

BRIEF DESCRIPTION OF THE DRAWINGS

FIG. 1 schematically illustrates in partial cutaway view some nomenclature and the relationships between various volumes in a substrate;

FIG. 2 schematically indicates creation of a waveguiding region by means of metal in-diffusion;

FIG. 3 schematically shows the result of ion exchange in a selected volume of the substrate;

FIG. 4 schematically shows the result of carrying out, in sequence, metal in-diffusion and Li/Ag exchange; and FIG. 5 schematically indicates the result of carrying out, in sequence, Li out-diffusion and Ti in-diffusion.

DETAILED DESCRIPTION

Optical waveguides in integrated optics devices can be produced by a variety of techniques, all having in common the ability to change the value of the refractive index (or indices) of the material in a selected region of a substrate. Since this application is concerned with devices comprising waveguides in optically anisotropic materials that are capable of guiding both TE and TM modes, the discussion will be limited to waveguide-forming techniques that change both $n_o$ and $n_e$. Currently such techniques that are of practical significance are typically techniques for increasing both indices. Examples thereof are ion implantation and metal in-diffusion, the latter typically involving a transition metal such as titanium as the diffusing species. However, the instant inventive method is not limited to the use of any particular technique for changing both $n_o$ and $n_e$. Examples of such techniques are well documented in the literature (see, for instance, J. Noda and M. Fukuma, *International Conference on Integrated Optics and Optical Fiber Communications*, Tokyo (1977), pp. 575–578).

Although metal in-diffusion, typically Ti diffusion, is a standard technique for fabricating waveguides in $LiNbO_3$ and $LiTaO_3$, it frequently encounters difficulties due to the formation of an unwanted surface guide for TE modes. This formation can be prevented by carrying out the diffusion treatment in an appropriate atmosphere, for instance one at approximately ambient pressure and consisting essentially of more than about 10 Torr of water vapor in argon.

Optical waveguides typically have lateral dimensions of the order of one to several wavelengths of the radiation to be guided, and an axial dimension that measures many wavelengths. Furthermore, although waveguides frequently comprise bends or other nonstraight portions, at least that guiding part of the integrated optics devices of interest in which the value of birefringence is to be adjusted is typically straight. We consider the axial direction of this guiding section to define the major direction in the surface.

In thin-film optical waveguides the guided modes having the electric field vector substantially perpendicular to the plane of the film are conventionally referred to as the transverse magnetic (TM) modes, and the modes with electric field vector substantially in the plane of the film as the transverse electric (TE) modes. Integrated optics devices on optically anisotropic substrates typically are arranged such that the major direction (as defined above) coincides, or approximately coincides, with a major crystallographic direction, but this is not a general requirement. If this is the case then the relationship between the refractive indices and the effective indices is a very simple one, namely $N_{TM} \approx n_e$ or $n_o$, and $N_{TE} \approx n_o$ or $n_e$, depending on the orientation of the crystal forming the substrate, where N signifies the effective refractive index of the waveguide section, defined by $N = \beta/k$, with $\beta$ the propagation constant, and $k = 2\pi/\lambda$, where $\lambda$ is the free-space wavelength.

Some nomenclature and geometrical relationships are illustrated in FIG. 1. Optically anisotropic material, having bulk refractive indices $n_o$ and $n_e$ and crystallographic directions X-, Y-, and Z-, forms substrate 10 having a major surface 11 and direction 13 normal to the major surface. A first volume 14 of the substrate forms a waveguide having at least one straight section which defines major direction 12 in the surface, and which is capable of guiding both TE and TM modes. A second volume 15 of the substrate has refractive indices $n_o'$ and $n_e + \Delta n_e$ in the part thereof that is not contained within the waveguide. The straight section of the waveguide has effective indices $N_{TE}$ and $N_{TM}$ outside of section 16, the part of the waveguide contained within 15, and $N_{TE}'$ and $N_{TM}'$ inside of 16. Typical substrate materials are monocrystalline $LiNbO_3$ and $LiTaO_3$, and the electromagnetic radiation guided by the waveguide typically is in the optical or infrared part of the spectrum. It is to be understood that the values of refractive indices and effective indices always refer to a certain frequency $f_o$, the frequency of operation of the device. And it is further to be understood that the boundaries between the various volumes typically are not sharp, due to the characteristics of the processes used to modify the properties of the substrate material.

As has been discussed above, the inventive method comprises changing both refractive indices in a selected volume of a substrate to form in appropriate circumstances a waveguide capable of guiding both TE and TM modes. Exemplary techniques for increasing both indices are metal in-diffusion and ion implantation. FIG. 2 schematically shows, in cross section, substrate 10 having bulk refractive indices $n_o$ and $n_e$, and major surface 11, with a patterned metal film 20, e.g., Ti, deposited on 11. Appropriate treatment results in diffusion of metal from film 20 into the volume 14 of the substrate, as indicated by arrows 21. This in-diffusion results in a waveguide having effective indices $N_{TE}$ and $N_{TM}$.

The inventive method also comprises changing one of the indices without proportionally changing the other in a selected volume of a substrate. Exemplary techniques for increasing the extraordinary index in $LiNbO_3$ and $LiTaO_3$ without at the same time substantially increasing the ordinary index are ion exchange, such as, for instance, Li/Ag or Li/Tl exchange, and Li out-diffusion. FIG. 3 schematically illustrates this index-adjustment by means of ion exchange. Substrate 10, again having bulk indices $n_o$ and $n_e$, and major surface 11, partially covered by patterned mask 30, is contacted by ion exchange medium 31, typically a molten salt such as, for instance, AgNO$_3$. Ion exchange, indicated by arrows 32, results in the increase of $n_e$ by $\Delta n_e$ in volume 15, and possibly change of $n_o$ to $n_o'$.

The inventive method comprises appropriate combinations of the above-indicated steps, thereby obtaining the ability to adjust the value of the birefringence of all or part of a waveguide, including the special case of adjustment yielding zero birefringence. One possible combination is schematically indicated in FIG. 4, showing in cross section substrate 10 having major surface 11, and patterned mask 30. It is assumed that in an earlier processing step comprising, e.g., Ti in-diffusion, a waveguiding structure having effective indices $N_{TE}$ and $N_{TM}$ had been created in 10, analogous to the situation illustrated in FIG. 2. In the subsequent processing step, comprising e.g., Li/Ag exchange as indicated by arrows 32, the refractive indices of region 15 of FIG. 4 are changed to $n_o'$ and $n_e+\Delta n_e$, resulting in a change of the effective indices of waveguide region 16 to $N_{TE}'$ and $N_{TM}'$.

FIG. 5 schematically indicates a further possible combination. Substrate 10 having major surface 11, and a patterned metal film 20, e.g., Ti, deposited on 11, are shown in cross section. It is assumed that in an earlier processing step, comprising e.g., Li out-diffusion, the refractive indices in volume 15 had been changed from $n_o$ and $n_e$ to $n_o'$ and $n_e+\Delta n_e$. In a subsequent processing step, comprising e.g., Ti in-diffusion as indicated by arrows 21, both refractive indices of volume 16 are increased, thereby creating a waveguiding structure having effective indices $N_{TE}'$ and $N_{TM}'$.

Li out-diffusion has been observed previously in LiNbO$_3$ and LiTaO$_3$, and it is known that it results in an increase in $n_e$ in a near-surface region substantially independent of crystallographic orientation, without substantially increasing $n_o$. See, for instance, J. R. Carruthers et al, *Applied Optics*, Vol. 13(10), pp. 2333-2342 (1974). These properties of Li out-diffusion can be used to accomplish the index adjustment according to the invention, as was exemplified in FIG. 5. Since out-diffusion typically is to be restricted to a selected volume of substrate, Li loss from some substrate regions has to be avoided, typically by means of an appropriate mask, for instance, a patterned SiO$_2$ layer. In general, masking materials should be chemically stable at the out-diffusion temperatures, which, because of rate considerations, typically are greater than about 700° C., advantageously greater than about 900° C., form penetration barriers to Li$_2$O at these temperatures, and not undergo significant diffusion into the substrate during the heat treatment.

Since the heat treatment required for out-diffusion would typically result in changes in previously established diffusion profiles, or in a healing of lattice damage, out-diffusion is advantageously carried out prior to waveguide formation by metal in-diffusion or ion implantation. And since out-diffusion is inhibited by the presence in the atmosphere during heat treatment of a sufficient concentration of hydrogen donor, such as, for instance, more than about 10 Torr of water vapor in Ar, this processing step is advantageously carried out in an atmosphere substantially free of hydrogen donors.

Out-diffusion results in the establishment of an approximately Gaussian refractive index profile in $n_e$, with maximum increase at the surface, and an effective depth that depends on diffusion temperature and time, as well as on crystal orientation (see e.g., J. R. Carruthers, op. cit). Therefore, it is necessary to appropriately adjust these parameters to achieve the desired change in the effective refractive index of the waveguide section.

Typically, the change in $\Delta n$ obtainable by Li out-diffusion is small, of the order of 0.01. For devices requiring greater adjustment of the value of birefringence, as well as for devices which are detrimentally affected by exposure to the relatively high temperatures required for Li out-diffusion, ion exchange is a preferred method for adjusting the value of the birefringence. Ion exchange is typically carried out by contacting selected regions of the major surface of a substrate, for instance of a monocrystalline LiNbO$_3$ or LiTaO$_3$ substrate, with a liquid ion exchange medium, typically a molten salt. See, for instance, J. L. Jackel, (Case 2), U.S. patent application, Ser. No. 228,465 filed Jan. 26, 1981 entitled "Method for Producing Devices Comprising Optical Waveguiding Structures in LiNbO$_3$ and LiTaO$_3$."

Several metal ions are known to result in an increase in $n_e$ in X-cut LiNbO$_3$ or LiTaO$_3$ without substantially increasing $n_o$ when substituted for Li by means of ion exchange. Among them are Ag and Tl, both of which can conveniently be exchanged by contacting the substrate with the molten nitrate of the respective metal at a temperature below about 370° C., advantageously at a temperature not more than about 250° C., typically for a period of several hours. For details of the Li/Ag exchange, see J. L. Jackel, *Applied Optics*, Vol. 19(12), pp. 1996-1999 (June 1980), and for details of the Li/Tl exchange the U.S. patent application Ser. No. 228,465, cited above.

Both Li/Ag and Li/Tl exchange in LiNbO$_3$ and LiTaO$_3$ proceed at substantial rate only in the crystallographic X-direction, thus they are applicable essentially only for substrates oriented such that the X-direction does not lie in the major surface. In current practice, this typically means that Li/Ag and Li/Tl exchange is used in X-cut LiNbO$_3$ and LiTaO$_3$ substrates.

Just as is required for index adjustment by means of Li out-diffusion, ion exchange in a selected volume of substrate requires the masking of surface regions. This can be accomplished by photolithographic techniques well known in the integrated circuit art, using as masks, for instance, patterned Au, Cr, Si$_x$N$_y$ or SiO$_2$ layers.

In order to be of sufficient practical value, the amount by which the birefringence in the selected volume can be adjusted by the exemplary or other index adjusting methods should exceed a certain minimum value. This is most easily expressed in terms of changes in the absolute value of the difference between the effective index for TE and that for TM modes. In particular, we consider that typically $|N_{TE}'-N_{TM}'|$ should differ from $|N_{TE}-N_{TM}|$ by at least about 0.01%. In these expressions, the bars signify the absolute value, the unprimed effective indices refer to waveguide sections oriented in the major direction in which the value of the birefringence has not been adjusted, and the primed effective indices to the waveguide section in which the value has been adjusted.

What is claimed is:

1. Method for manufacturing an integrated optics device comprising a substrate of optically anisotropic material, the substrate having a major surface, and a major direction in the surface, an ordinary index of refraction and an extraordinary index of refraction for electromagnetic radiation propagating in the major direction, the method comprising (a) changing both the ordinary and the extraordinary index in a volume of the substrate, thereby producing a waveguide for both TE and TM modes of the radiation, CHARACTERIZED BY the further step of (b) adjusting the value of the difference between the ordinary index and the extraordinary index in at least part of the waveguide.

2. Method of claim 1 wherein the optically anisotropic material comprises material selected from the group consisting of $LiNbO_3$ and $LiTaO_3$.

3. Method of claim 2, wherein the changing of both the ordinary and the extraordinary index in step (a) is accomplished by means of ion implantation.

4. Method of claim 2, wherein the changing of both the ordinary and the extraordinary index in step (a) is accomplished by means of metal in-diffusion.

5. Method of claim 4, wherein the metal indiffusion is transition metal in-diffusion.

6. Method of claim 5, wherein the transition metal in-diffusion is Ti in-diffusion.

7. Method of claim 2 wherein the adjusting of the value of the difference between the ordinary index and the extraordinary index is accomplished by means of Li out-diffusion.

8. Method of claim 2 wherein the adjusting of the value of the difference between the ordinary index and the extraordinary index is accomplished by means of ion exchange.

9. Method of claim 8, wherein the ion exchange is Li/Ag exchange or Li/Tl exchange.

10. Method of claim 9, wherein the Li/Ag exchange is accomplished by contacting at least part of the major surface of the substrate with an exchange medium comprising molten $AgNO_3$ at a temperature below about 370° C.

11. Method of claim 9, wherein the Li/Tl exchange is accomplished by contacting at least part of the major surface of the substrate with an exchange medium comprising $TlNO_3$ at a temperature below about 370° C.

12. Method of claim 2, wherein the changing of both the ordinary and the extraordinary index is accomplished by means of transition metal in-diffusion, and the adjusting of the value of the difference between the ordinary index and the extraordinary index is accomplished by means of ion exchange.

13. Method of claim 12, wherein the transition metal in-diffusion is Ti in-diffusion, and the ion exchange is Ag/Li or Tl/Li exchange.

14. Method of claim 13, wherein the Ag/Li exchange is accomplished by contacting at least part of the major surface of the substrate with an exchange medium comprising molten $AgNO_3$ at a temperature below about 370° C.

15. Method of claim 13, wherein the Tl/Li exchange is accomplished by contacting at least part of the major surface of the substrate with an exchange medium comprising molten $TlNO_3$ at a temperature below about 370° C.

16. Method of claims 14 or 15, wherein the temperature is not more than about 250° C.

17. Method for manufacturing an integrated optics device comprising a substrate of monocrystalline material comprising material selected from the group consisting of $LiNbO_3$ and $LiTaO_3$, the substrate having a major surface and a major direction in the surface, an ordinary index of refraction and an extraordinary index of refraction for electromagnetic radiation propagating in the major direction, the method comprising (a) increasing both the ordinary and the extraordinary index in a volume of the substrate by means of Ti in-diffusion, thereby producing a waveguide for both TE and TM modes of the radiation, CHARACTERIZED BY the further step of (b) increasing by means of Li out-diffusion, Li/Ag exchange or Li/Tl exchange the value of the extraordinary index in at least part of the waveguide without substantially increasing the ordinary index in the part.

18. A device manufactured according to the method of claims 1 or 17.

* * * * *